US012320713B2

(12) United States Patent
Chiang et al.

(10) Patent No.: US 12,320,713 B2
(45) Date of Patent: Jun. 3, 2025

(54) TEMPERATURE DETECTING APPARATUS (71) Applicant: PIXART IMAGING INC., Hsin-Chu (TW)

(72) Inventors: Han-Lin Chiang, Hsin-Chu (TW); Shih-Feng Chen, Hsin-Chu (TW); Ning Shyu, Hsin-Chu (TW)

(73) Assignee: PIXART IMAGING INC., Hsin-Chu (TW)

(*) Notice: Subject to any disclaimer, the term of this patent is extended or adjusted under 35 U.S.C. 154(b) by 604 days.

(21) Appl. No.: 17/583,344

(22) Filed: Jan. 25, 2022

(65) Prior Publication Data
US 2023/0236073 A1    Jul. 27, 2023

(51) Int. Cl.
| G01K 13/20 | (2021.01) |
| B25J 13/00 | (2006.01) |
| F24F 11/30 | (2018.01) |
| G01K 3/00 | (2006.01) |
| G05D 1/02 | (2020.01) |
| A47L 9/28 | (2006.01) |
| F24C 3/12 | (2006.01) |
| F24F 110/10 | (2018.01) |

(52) U.S. Cl.
CPC ............ G01K 13/20 (2021.01); G01K 3/005 (2013.01); A47L 9/2805 (2013.01); B25J 13/006 (2013.01); F24C 3/126 (2013.01); F24F 11/30 (2018.01); F24F 2110/10 (2018.01)

(58) Field of Classification Search
CPC ....... F24F 11/30; F24F 2110/10; F24C 3/126; F24C 5/025; F24C 5/047; F24C 5/0066; F24C 5/48; F24C 2005/0077; G01K 3/005; G01K 13/20; A47L 9/2805; G05D 1/0274; G05D 1/0022; B25J 13/006; H04L 12/2856; H04L 12/282
See application file for complete search history.

(56) References Cited

U.S. PATENT DOCUMENTS

| 10,001,288 B1* | 6/2018 | Yang ................. F24F 11/79 |
| 2012/0066168 A1* | 3/2012 | Fadell ................. H05B 47/115 |
| | | 702/140 |
| 2014/0207281 A1* | 7/2014 | Angle ................. B25J 13/006 |
| | | 700/257 |
| 2018/0299899 A1* | 10/2018 | Suvarna ................. A47L 9/2805 |
| 2019/0212760 A1* | 7/2019 | Tiwari ................. G06Q 10/08 |

* cited by examiner

*Primary Examiner* — Randy W Gibson
(74) *Attorney, Agent, or Firm* — Li & Cai Intellectual Property (USA) Office (57) ABSTRACT A temperature detecting apparatus is provided. The temperature detecting apparatus includes a movable carrier and a thermal sensor. The movable carrier includes a control module, and is movable in a working place according to a designated command. The thermal sensor is assembled to the movable carrier and is electrically coupled to the control module. When the movable carrier is moved according to the designated command, the thermal sensor is configured to detect the working place so as to generate an immediate temperature distribution of the working place. Moreover, when the immediate temperature distribution generated from the thermal sensor has an abnormal temperature value, the control module is configured to emit a warning signal to an external apparatus.

11 Claims, 13 Drawing Sheets

TEMPERATURE DETECTING APPARATUS

FIELD OF THE DISCLOSURE

The present disclosure relates to a detecting apparatus, and more particularly to a temperature detecting apparatus.

BACKGROUND OF THE DISCLOSURE

A movable carrier is more and more widely used, for example, the movable carrier can be used to perform functions of conveying objects, cleaning environment, or the others. However, the development of the movable carrier has been limited to the above existing functions.

SUMMARY OF THE DISCLOSURE

In response to the above-referenced technical inadequacy, the present disclosure provides a temperature detecting apparatus to effectively improve on the issues associated with conventional movable carriers.

In one aspect, the present disclosure provides a temperature detecting apparatus, which includes a movable carrier and a thermal sensor. The movable carrier includes a control module and a map creating module that is electrically coupled to the control module. The movable carrier is movable in a working place according to a predetermined schedule, so that the map creating module is configured to create a digital working map that corresponds to the working place. The thermal sensor is assembled to the movable carrier and is electrically coupled to the control module. When the movable carrier is moved according to the predetermined schedule, the thermal sensor is configured to detect the working place so as to generate an immediate temperature distribution of the working place. The control module is configured to map the immediate temperature distribution onto the digital working map so as to create a temperature monitoring map, and the control module is configured to transmit the temperature monitoring map to an external apparatus.

In certain embodiments, after the temperature monitoring map is created, the control module is configured to compare the immediate temperature distribution to the temperature monitoring map, and a temperature value in the immediate temperature distribution is defined as an abnormal temperature value when the temperature value is lower than or higher than a corresponding temperature value in the temperature monitoring map by a predetermined difference.

In certain embodiments, before the immediate temperature distribution is compared to the temperature monitoring map, the control module is configured to compare the immediate temperature distribution to an environment temperature value adjacent to the movable carrier, and a temperature value in the immediate temperature distribution is defined as the abnormal temperature value when the temperature value is lower than or higher than the environment temperature value by another predetermined difference.

In certain embodiments, before the immediate temperature distribution is compared to the temperature monitoring map, the control module is configured to compare the immediate temperature distribution to a predetermined temperature value, and a temperature value in the immediate temperature distribution is defined as the abnormal temperature value when the temperature value is lower than or higher than the predetermined temperature value by another predetermined difference.

In certain embodiments, when the movable carrier is moved in the working place to implement an environment clean process according to the predetermined schedule, the thermal sensor synchronously generates the immediate temperature distribution.

In certain embodiments, when the immediate temperature distribution generated from the thermal sensor has an abnormal temperature value, the movable carrier is configured to stop implementing the environment clean process, and the movable carrier is configured to move toward an abnormal region of the working place having the abnormal temperature value so as to determine a range of the abnormal region.

In certain embodiments, the temperature detecting apparatus further includes a wireless connection unit electrically coupled to the control module. The temperature detecting apparatus is configured to be electrically coupled to at least one home appliance. When the immediate temperature distribution generated from the thermal sensor has an abnormal temperature value in an abnormal region, the control module is configured to transmit a driving signal to the at least one home appliance for driving the at least one home appliance to change a temperature value of the abnormal region.

In certain embodiments, the at least one home appliance includes an air conditioner. When the abnormal region is located at a sensing region of the air conditioner, the control module is configured to transmit a driving signal to the air conditioner for blowing toward the abnormal region.

In certain embodiments, the at least one home appliance includes a gas stove. When the abnormal region is located at the gas stove, the control module is configured to transmit a driving signal to the gas stove for stopping operation of the gas stove.

In certain embodiments, the thermal sensor is rotatably assembled to the movable carrier, so that the immediate temperature distribution generated by the thermal sensor is in a three-dimensional distribution.

In certain embodiments, when the working place includes at least one room for a person or a pet, the movable carrier is configured to be moved in the at least one room so as to allow the thermal sensor to detect a body temperature of the person or a body temperature of the pet.

In another aspect, the present disclosure provides a temperature detecting apparatus, which includes a movable carrier and a thermal sensor. The movable carrier includes a control module, and the movable carrier is movable in a working place according to a designated command. The thermal sensor is assembled to the movable carrier and is electrically coupled to the control module. When the movable carrier is moved according to the designated command, the thermal sensor is configured to detect the working place so as to generate an immediate temperature distribution of the working place. When the immediate temperature distribution generated from the thermal sensor has an abnormal temperature value, the control module is configured to emit a warning signal to an external apparatus.

In certain embodiments, the movable carrier is periodically movable in the working place according to the designated command.

In certain embodiments, the control module is configured to compare the immediate temperature distribution to an environment temperature value adjacent to the movable carrier, and a temperature value in the immediate temperature distribution is defined as the abnormal temperature value when the temperature value is lower than or higher than the environment temperature value by a predetermined difference.

In certain embodiments, the control module is configured to compare the immediate temperature distribution to a predetermined temperature value, and a temperature value in the immediate temperature distribution is defined as the abnormal temperature value when the temperature value is lower than or higher than the predetermined temperature value by a predetermined difference.

In certain embodiments, the temperature detecting apparatus further includes a map creating module that is electrically coupled to the control module. When the movable carrier is moved according to the designated command, the map creating module is configured to create a digital working map that corresponds to the working place. The control module is configured to map the immediate temperature distribution onto the digital working map so as to create a temperature monitoring map, and the control module is configured to transmit the temperature monitoring map to the external apparatus.

In certain embodiments, after the temperature monitoring map is created, the control module is configured to compare the immediate temperature distribution to the temperature monitoring map, and a temperature value in the immediate temperature distribution is defined as the abnormal temperature value when the temperature value is lower than or higher than a corresponding temperature value in the temperature monitoring map by a predetermined difference.

In certain embodiments, the warning signal emitted from the control module is configured to show an abnormal region of the working place having the abnormal temperature value.

In certain embodiments, when the abnormal temperature value is detected, the movable carrier is configured to move toward an abnormal region of the working place having the abnormal temperature value so as to determine a range of the abnormal region.

In certain embodiments, the thermal sensor is rotatably assembled to the movable carrier, so that the immediate temperature distribution generated by the thermal sensor is in a three-dimensional distribution.

Therefore, the temperature detecting apparatus of the present disclosure is provided with the cooperation of the movable carrier and the thermal sensor, so that when the movable carrier is moved in the working place according to the predetermined schedule (or the designated command), the temperature detecting apparatus can implement the dynamical temperature monitor and record of the working place, thereby effectively improving the safety of the working place and expanding a new function other than the existing functions.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 3B, an embodiment of the present disclosure provides a temperature detecting apparatus 100. The temperature detecting apparatus 100 is provided to be operated in a working place 200 for implementing a dynamical temperature monitor and record of the working place 200, thereby effectively improving the safety of the working place 200. As shown in FIG. 1 to FIG. 3C, the temperature detecting apparatus 100 in the present embodiment includes a movable carrier 1, a thermal sensor 2 assembled to the movable carrier 1, and a wireless connection unit 3, but the present disclosure is not limited thereto. For example, in other embodiments of the present disclosure not shown in the drawings, the wireless connection unit 3 can be omitted or can be replaced by other components.

Figure 1:
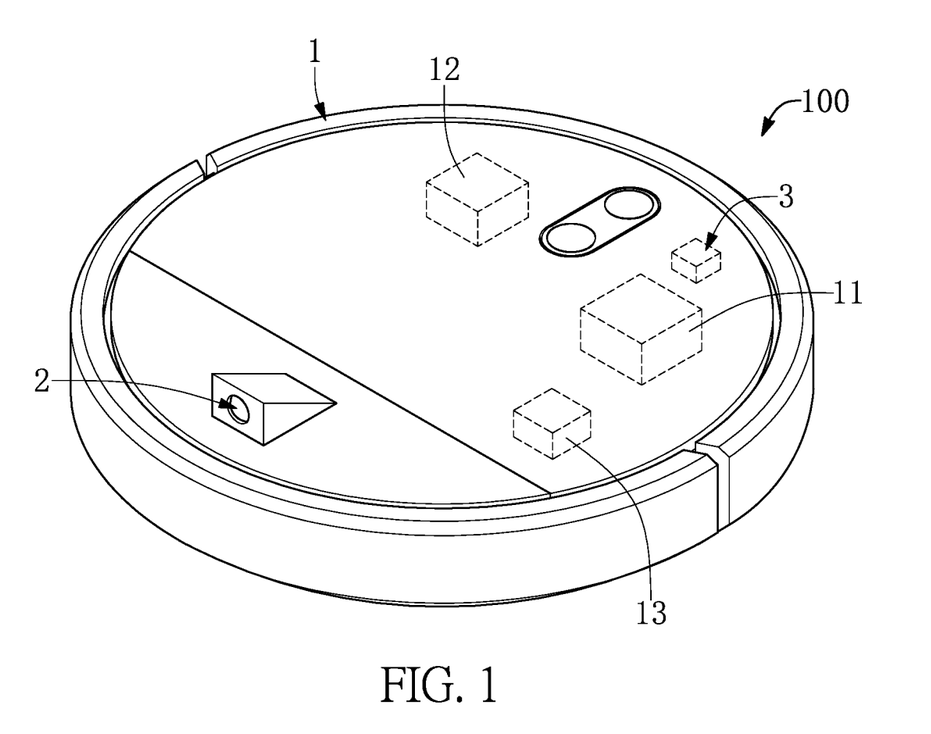
FIG. 1 is a perspective view of a temperature detecting apparatus according to an embodiment of the present disclosure.

In order to clearly describe the present embodiment, the movable carrier 1 in the following description is a robot vacuum cleaner, but the present disclosure is not limited thereto. For example, in other embodiments of the present disclosure not shown in the drawings, the movable carrier 1 can be a robot window cleaner, a transport robot in an automatic storage retrieval system, or an overhead hoist transfer (OHT) in a clean room. In addition, the movable carrier 1 can be used to only carry the thermal sensor 2, and does not have the above transporting or cleaning functions.

Figure 2:
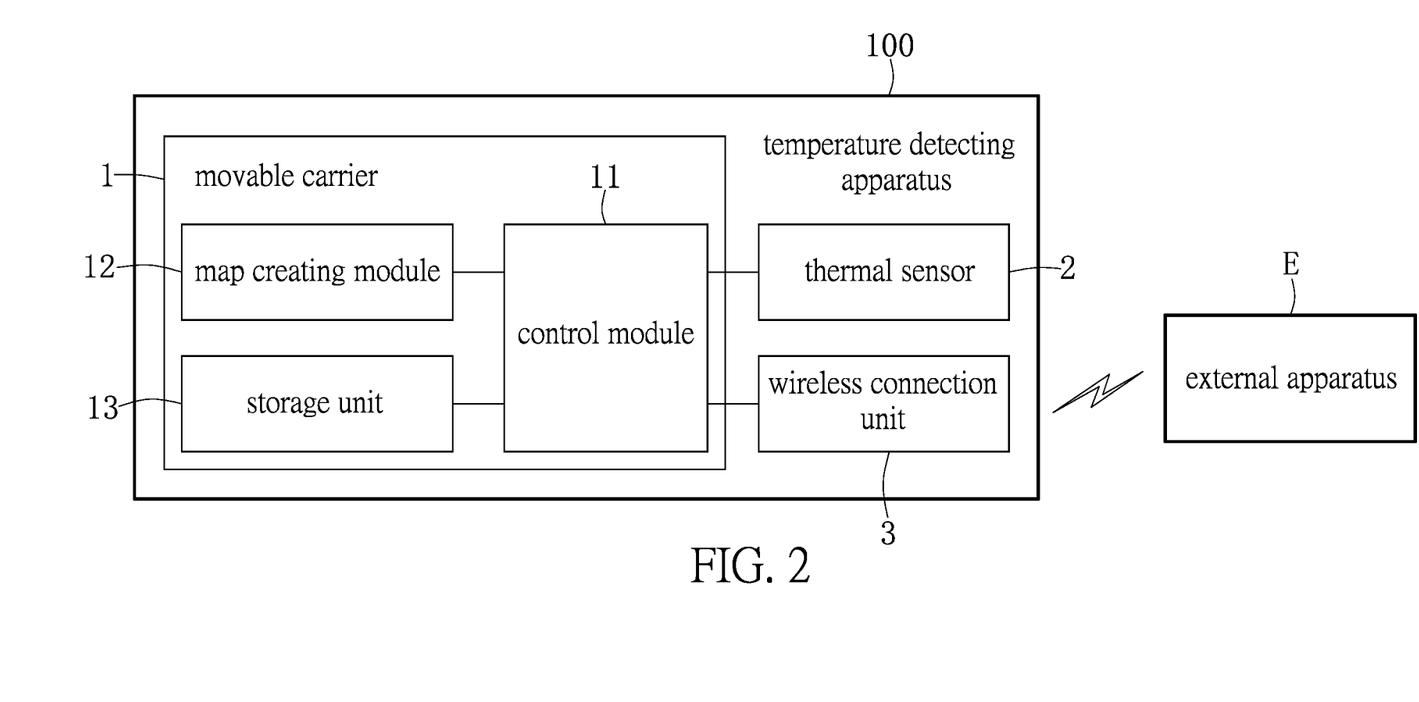
FIG. 2 is a functional block diagram of the temperature detecting apparatus of FIG. 1.

Specifically, the movable carrier 1 in the present embodiment includes a control module 11 and a map creating module 12 that is electrically coupled to the control module 11. The control module 11 is electrically coupled to the thermal sensor 2 and the wireless connection unit 3. The above components of the temperature detecting apparatus 100 can be adjusted or changed according to design requirements, and the present disclosure is not limited by the present embodiment.

Figure 3A:
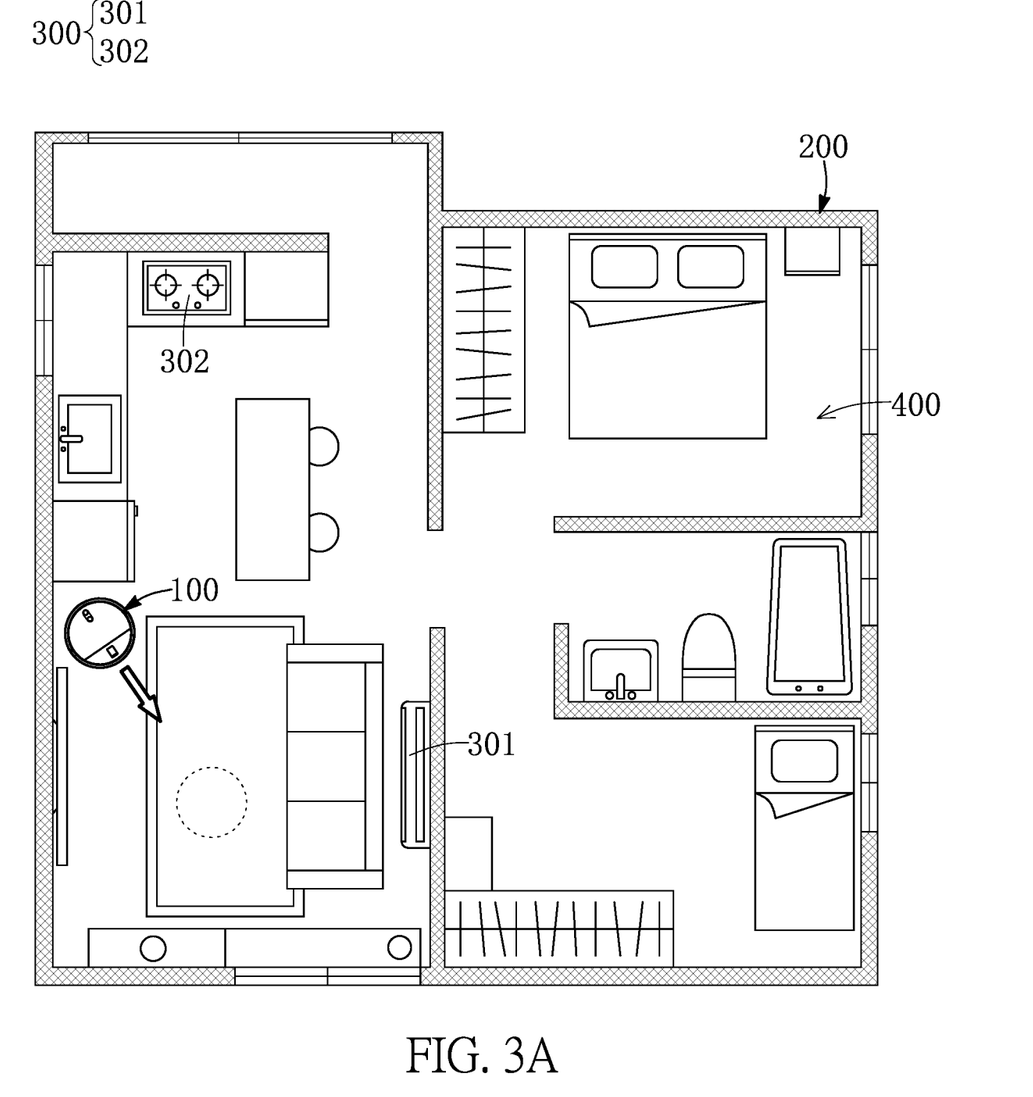
FIG. 3A is a planar view showing the temperature detecting apparatus of FIG. 1 operated in a working place.

The movable carrier 1 is movable in the working place 200 according to a predetermined schedule, so that the map creating module 12 is configured to create a digital working map D200 that corresponds to the working place 200. Specifically, when the robot vacuum cleaner (i.e., the movable carrier 1) is activated at a predetermined time, the robot vacuum cleaner would move in the working place 200 so as to create the digital working map D200 through the map creating module 12, but the present disclosure is not limited thereto. For example, in other embodiments of the present disclosure not shown in the drawings, the movable carrier 1 can be provided without the map creating module 12.

Moreover, when the movable carrier 1 is moved according to the predetermined schedule, the thermal sensor 2 is configured to detect the working place 200 so as to generate an immediate temperature distribution T200 of the working place 200. In the present embodiment, the thermal sensor 2 is rotatably assembled to the movable carrier 1, so that the immediate temperature distribution T200 generated by the thermal sensor 2 is in a three-dimensional distribution (e.g., the thermal sensor 2 can be rotated to detect from a ground to a ceiling).

Furthermore, when the movable carrier 1 of the present embodiment is moved in the working place 200 to implement an environment clean process according to the predetermined schedule, the thermal sensor 2 synchronously generates the immediate temperature distribution T200. In other words, the movable carrier 1 can periodically (or repeatedly) implement the environment clean process according to the predetermined schedule, so that when the movable carrier 1 implements the environment clean process at each time, the thermal sensor 2 can synchronously generate or update the immediate temperature distribution T200, but the present disclosure is not limited thereto.

For example, the movable carrier 1 can be movable in the working place 200 according to a designated command. The designated command can be a movement path planned by a user according to practical requirements, that is to say, the predetermined schedule is only one kind of the designated command. In other words, the movable carrier 1 can be periodically or aperiodically movable in the working place 200 according to the designated command. Moreover, when the movable carrier 1 is moved according to the designated command, the thermal sensor 2 is configured to detect the working place 200 so as to generate the immediate temperature distribution T200 of the working place 200.

Figure 3B:
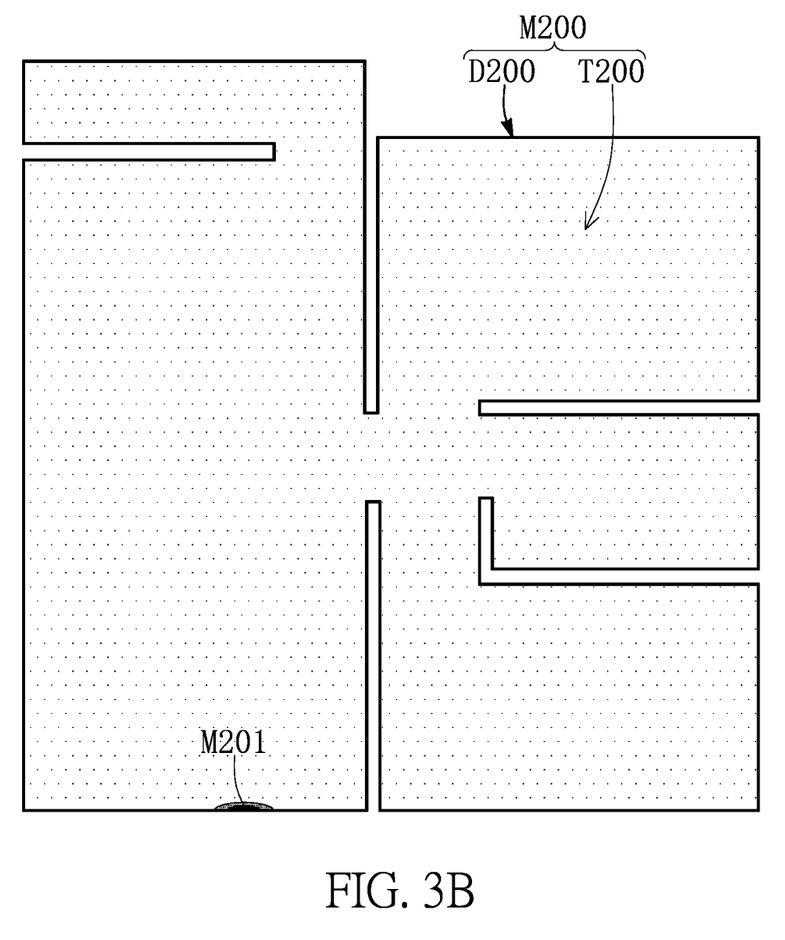
FIG. 3B is a schematic view showing a temperature monitoring map corresponding to FIG. 3A.

In the present embodiment, a temperature detection result of the temperature detecting apparatus 100 can be outwardly transmitted by the following manner the control module 11 is configured to map the immediate temperature distribution T200 onto the digital working map D200 so as to create a temperature monitoring map M200, and the control module 11 is configured to transmit the temperature monitoring map M200 to an external apparatus E (e.g., the user's cell phone) through the wireless connection unit 3.

Moreover, the temperature detection result of the temperature detecting apparatus 100 can also be outwardly transmitted by the following manner when the immediate temperature distribution T200 generated from the thermal sensor 2 has an abnormal temperature value, the control module 11 is configured to emit a warning signal (e.g., a sound signal, an image signal, or a text signal) to the external apparatus E. Specifically, the warning signal emitted from the control module 11 is configured to show an abnormal region M201 of the working place 200 having the abnormal temperature value (e.g., the abnormal region M201 is shown in the temperature monitoring map M200).

Accordingly, the temperature detecting apparatus 100 of the present embodiment is provided with the cooperation of the movable carrier 1 and the thermal sensor 2, so that when the movable carrier 1 is moved in the working place 200 according to the predetermined schedule (or the designated command), the temperature detecting apparatus 100 can implement the dynamical temperature monitor and record of the working place 200, thereby effectively improving the safety of the working place 200 and expanding a new function other than the existing functions.

It should be noted that the abnormal temperature value in the present embodiment can be determined by at least one of the following judgement manners, so that the temperature detecting apparatus 100 can accurately determine whether there is abnormal temperature in the working place 200 under different conditions, but the present disclosure is not limited thereto.

First judgement manner before the temperature monitoring map M200 is created (or before the immediate temperature distribution T200 is compared to the temperature monitoring map M200), the control module 11 is configured to compare the immediate temperature distribution T200 to a predetermined temperature value, and a first temperature value in the immediate temperature distribution T200 is defined as the abnormal temperature value when the first temperature value is lower than or higher than the predetermined temperature value by a first predetermined difference.

Second judgement manner: before the temperature monitoring map M200 is created (or before the immediate temperature distribution T200 is compared to the temperature monitoring map M200), the control module 11 is configured to compare the immediate temperature distribution T200 to an environment temperature value adjacent to the movable carrier 1, and a second temperature value in the immediate temperature distribution T200 is defined as the abnormal temperature value when the second temperature value is lower than or higher than the environment temperature value by a second predetermined difference.

Third judgement manner after the temperature monitoring map M200 is created, the control module 11 is configured to compare the immediate temperature distribution T200 to the temperature monitoring map M200, and a third temperature value in the immediate temperature distribution T200 is defined as the abnormal temperature value when the third temperature value is lower than or higher than a corresponding temperature value in the temperature monitoring map M200 by a third predetermined difference.

It should be noted that any information or data described in the above judgement manners that are related to the abnormal temperature value of the present embodiment can be stored in a storage unit 13 of the movable carrier 1, and the control module 11 is electrically coupled to the storage unit 13 so as to determine the abnormal temperature value according to the above judgement manners, but the present disclosure is not limited thereto.

Figure 3C:
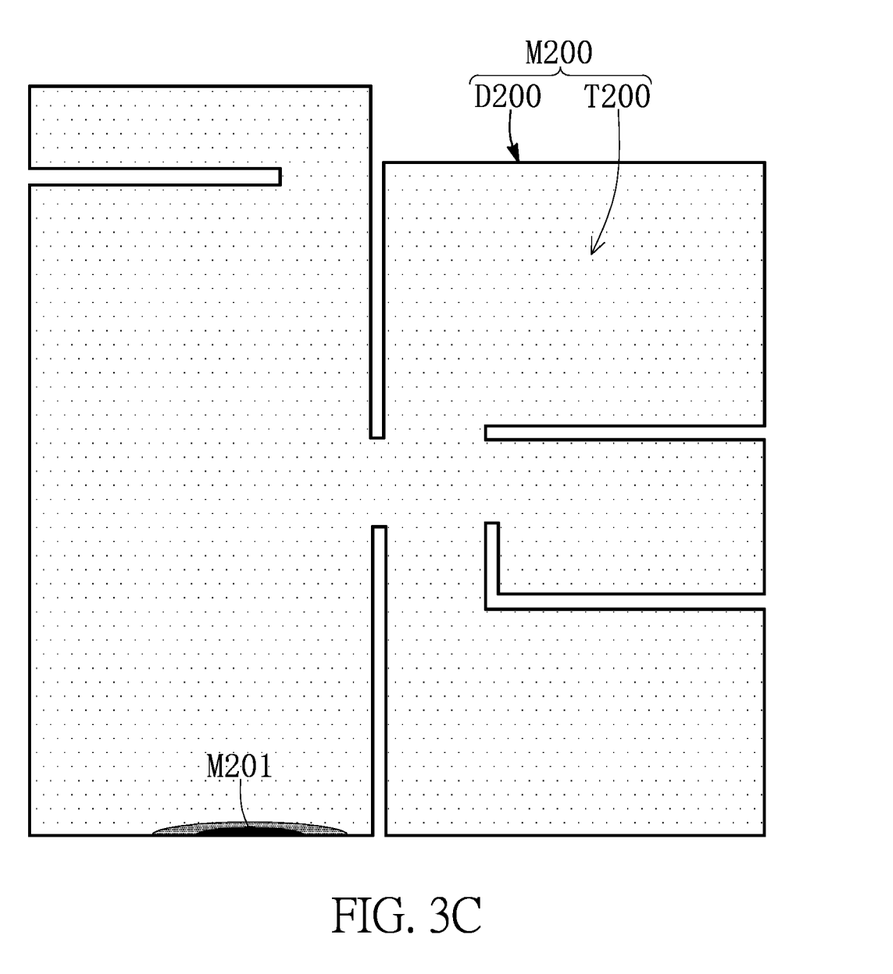
FIG. 3C is a schematic view showing the temperature monitoring map after the temperature detecting apparatus of FIG. 3A is moved toward an abnormal region.
Figure 4A:
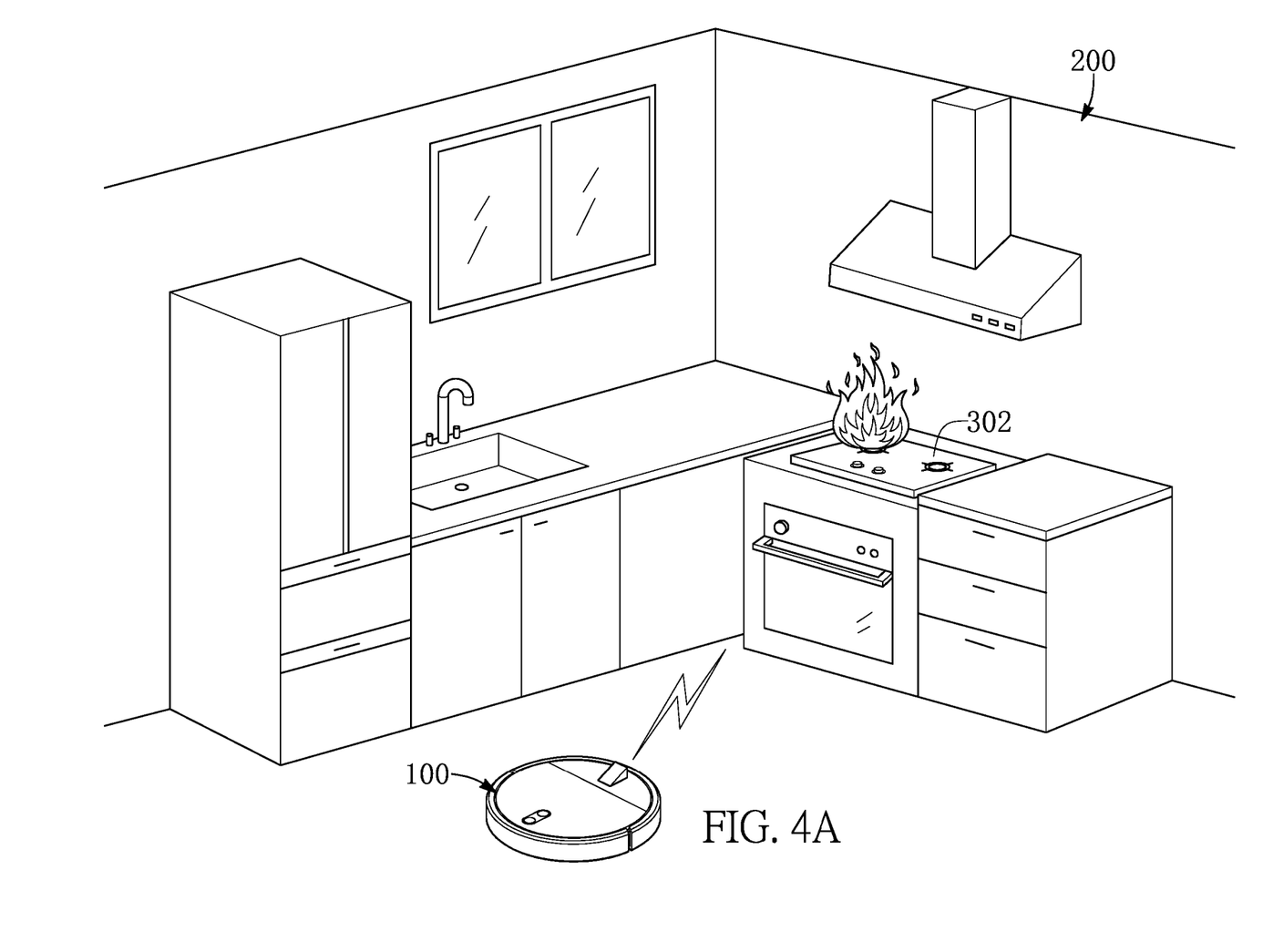
FIG. 4A is a perspective view showing the temperature detecting apparatus of FIG. 1 operated in a living room part of the working place having an air conditioner.
Figure 4B:
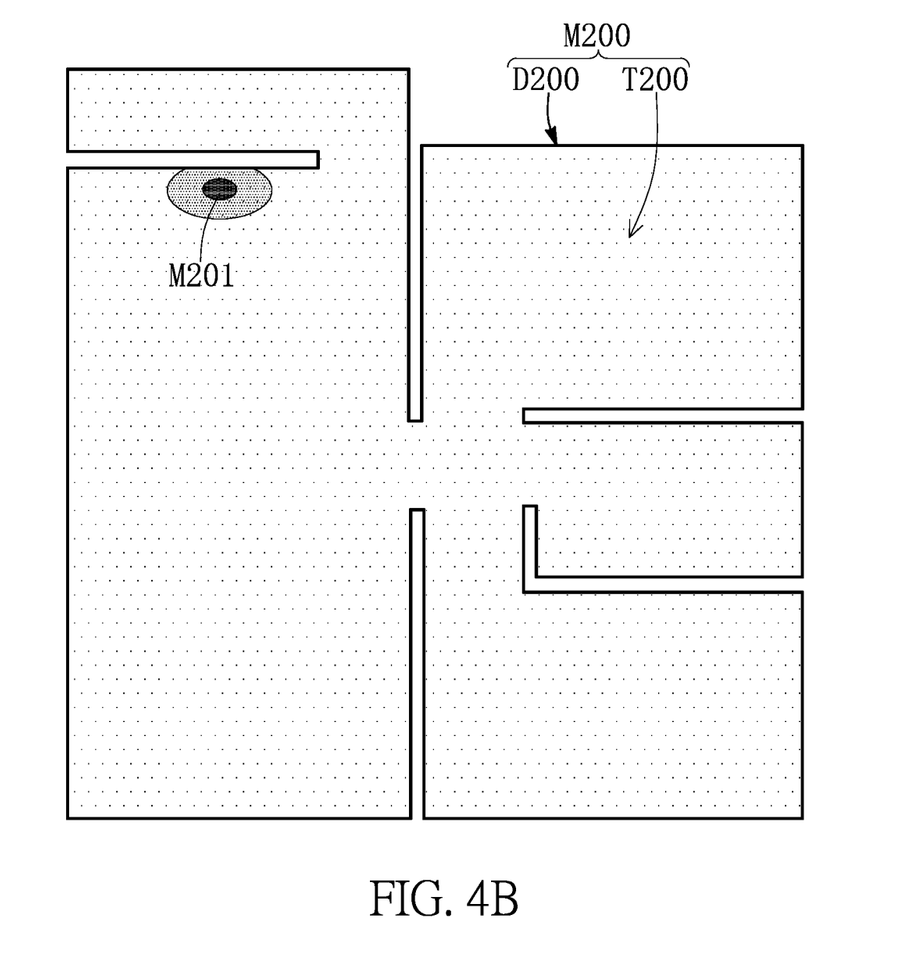
FIG. 4B is a schematic view showing the temperature monitoring map corresponding to FIG. 4A.
Figure 4C:
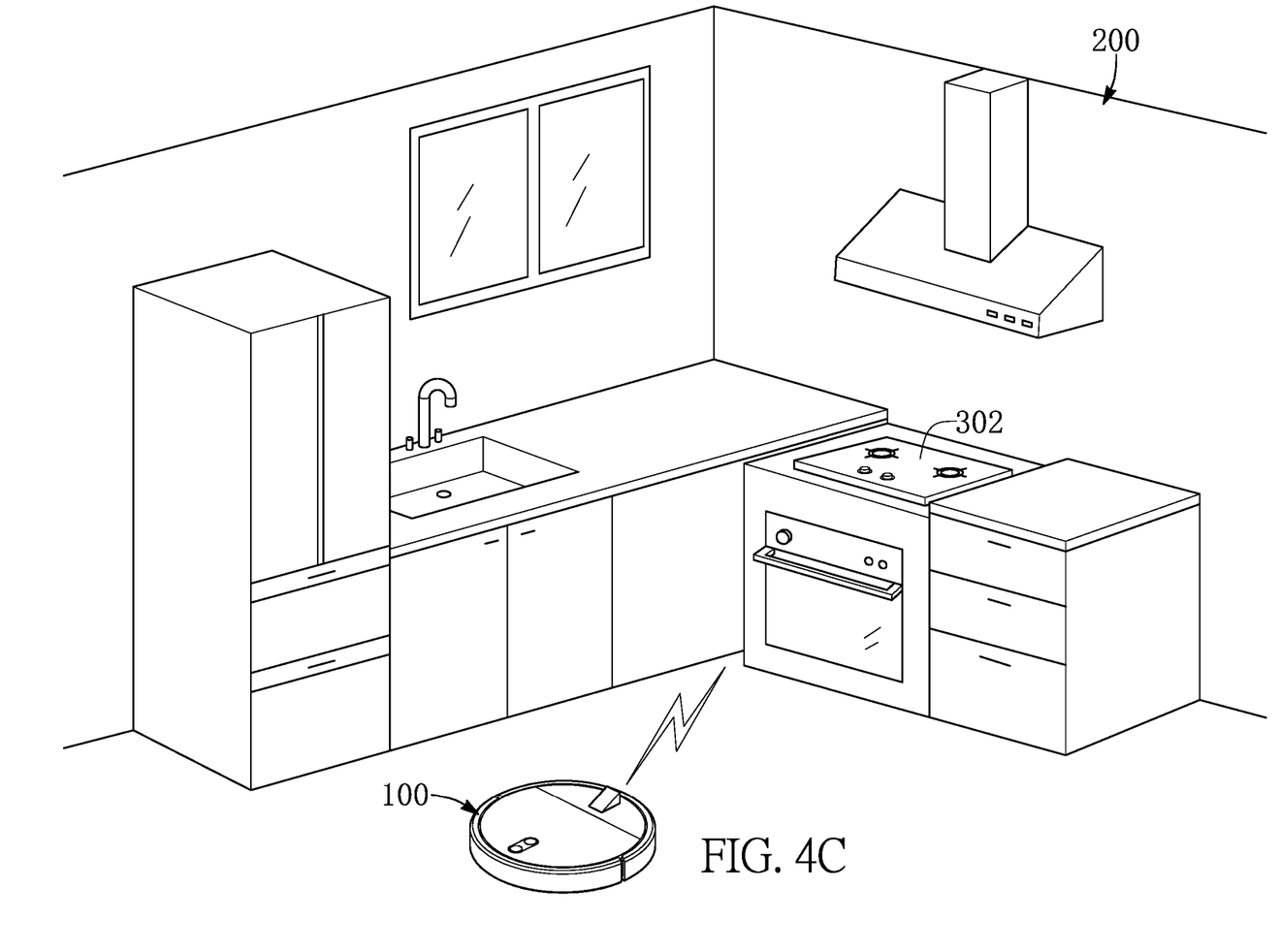
FIG. 4C is a perspective view showing the living room part of the working place of FIG. 4A after the air conditioner is changed to blow toward an abnormal region.
Figure 5A:
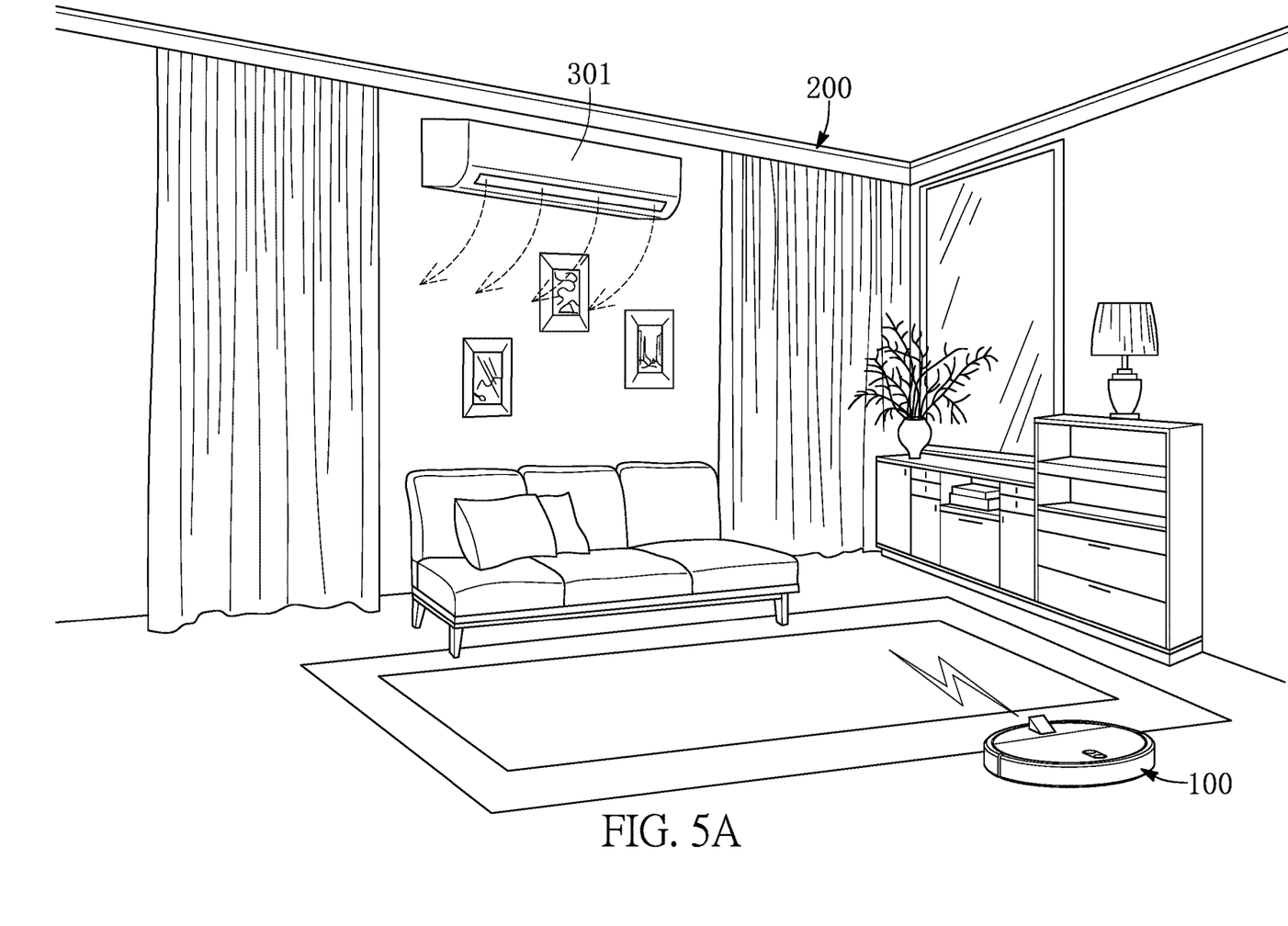
FIG. 5A is a perspective view showing the temperature detecting apparatus of FIG. 1 operated in a kitchen part of the working place having a gas stove.
Figure 5B:
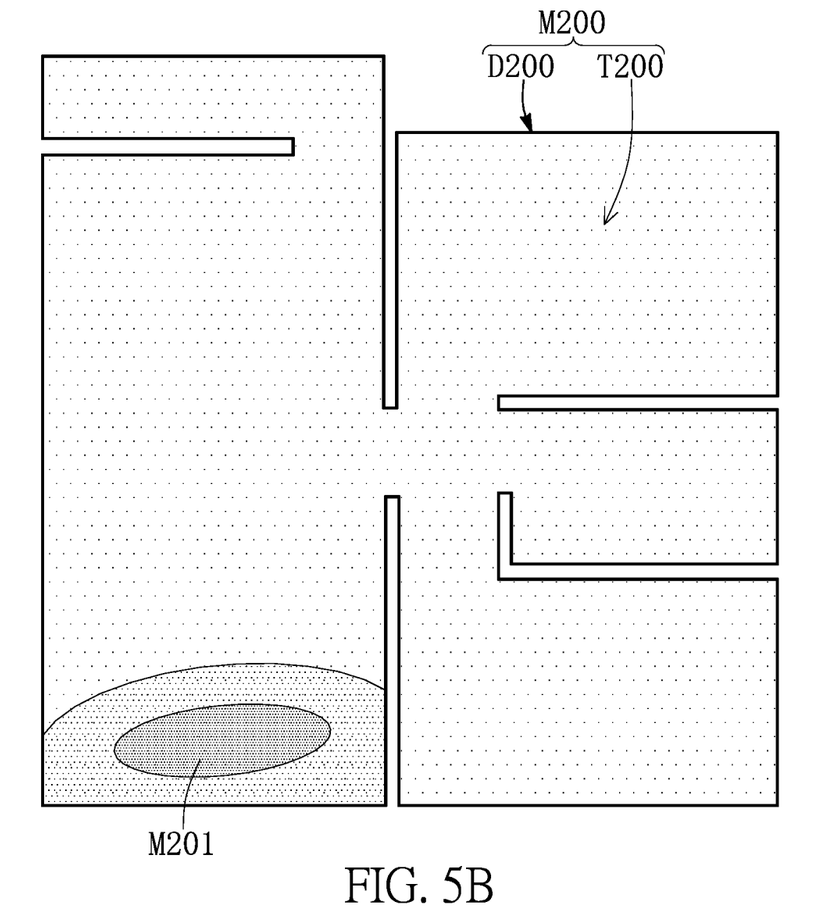
FIG. 5B is a schematic view showing the temperature monitoring map corresponding to FIG. 5A.
Figure 5C:
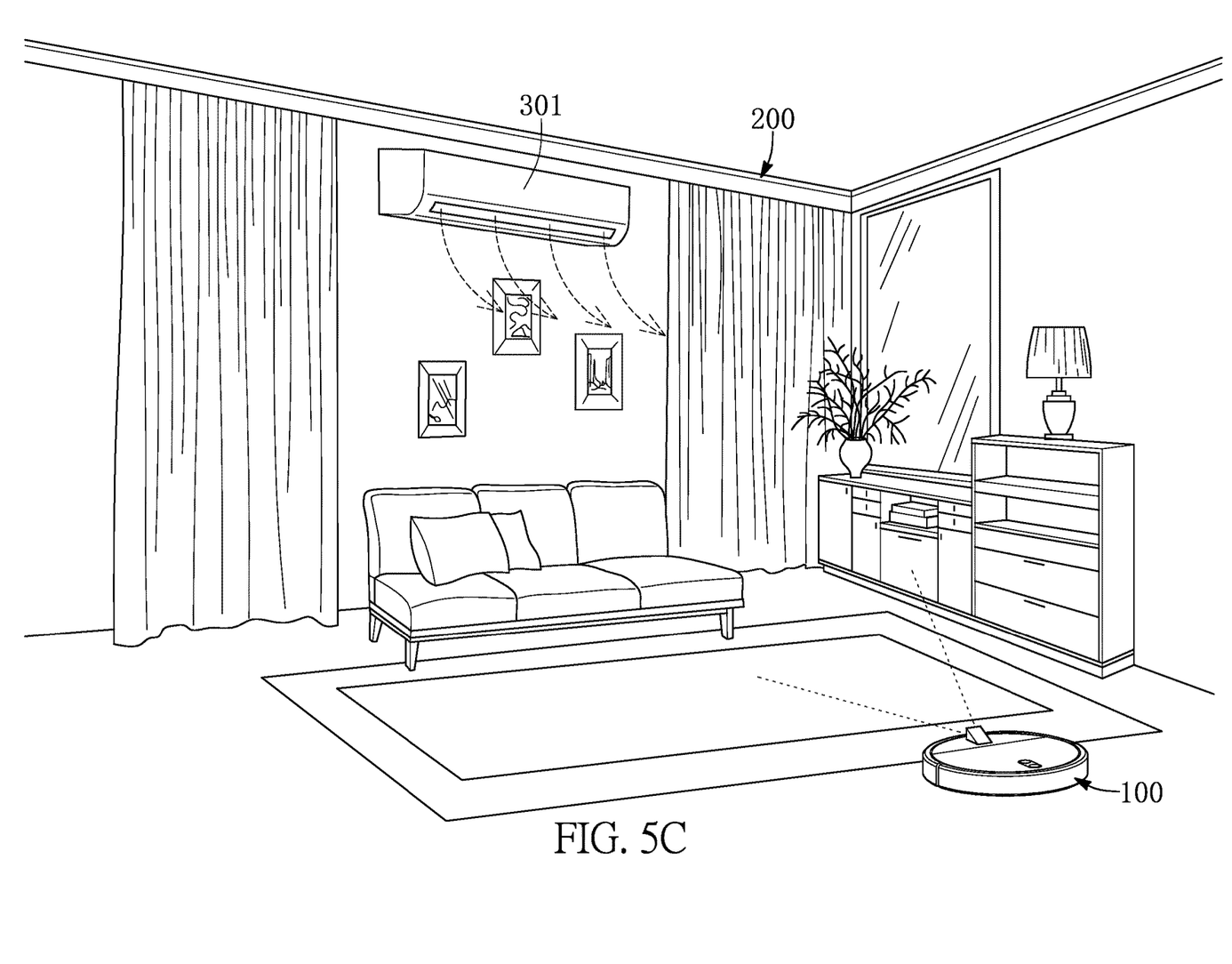
FIG. 5C is a perspective view showing the kitchen part of the working place of FIG. 5A after operation of the gas stove is stopped.

Accordingly, when the immediate temperature distribution T200 generated from the thermal sensor 2 has the abnormal temperature value, the movable carrier 1 is configured to stop implementing the environment clean process, and the movable carrier 1 is configured to move toward the abnormal region M201 of the working place 200 having the abnormal temperature value so as to determine a range of the abnormal region M201.

Specifically, the temperature detecting apparatus 100 can be used to monitor the temperature of the working place 200, and can be used to further implement a deep temperature planning according to the working place 200. The movable carrier 1 of the present embodiment in the following description is the robot vacuum cleaner, but the present disclosure is not limited thereto.

The temperature detecting apparatus 100 is configured to be electrically coupled to at least one home appliance 300 that is located in the working place 200. In the present embodiment, a quantity of the at least one home appliance 300 is more than one. The temperature detecting apparatus 100 and any one of the home appliances 300 can be wirelessly connected to each other in a Bluetooth connection manner or a Wi-Fi connection manner. Or, a front connection stage between the temperature detecting apparatus 100 and any one of the home appliances 300 can be communicated with each other in the Bluetooth connection manner, and a rear connection stage between the temperature detecting apparatus 100 and any one of the home appliances 300 can transmit data to each other in the Wi-Fi connection manner.

In summary, the temperature detecting apparatus 100 of the present embodiment can be electrically coupled to all of the home appliances 300 located in the working place 200 through the wireless connection unit 3, so that the temperature detecting apparatus 100 and the home appliances 300 can share temperature information for implementing an overall temperature planning of the working place 200.

Specifically, as shown in FIG. 2 and FIG. 4A to FIG. 5C, when the immediate temperature distribution T200 generated from the thermal sensor 2 has the abnormal temperature value in the abnormal region M201, the control module 11 is configured to transmit a driving signal to at least one of the home appliances 300 for driving at least one of the home appliances 300 to change a temperature value of the abnormal region M201.

For example, the home appliances 300 electrically coupled to the temperature detecting apparatus 100 includes a gas stove 302 and an air conditioner 301. As shown in FIG. 2 and FIG. 4A to FIG. 4C, when the abnormal region M201 is located at the gas stove 302 (e.g., the gas stove 302 is forgotten to be turned off), the control module 11 is configured to transmit the driving signal to the gas stove 302 for stopping operation of the gas stove 302, so that the temperature value of the abnormal region M201 can be changed or normalized.

Or, as shown in FIG. 2 and FIG. 5A to FIG. 5C, when the abnormal region M201 is located at a sensing region of the air conditioner 301 (e.g., the sensing region of the air conditioner 301 has a higher or lower temperature), the control module 11 is configured to transmit the driving signal to the air conditioner 301 for blowing toward the abnormal region M201 (e.g., the air conditioner 301 is activated to blow an airflow, or a direction of the airflow of the air conditioner 301 is changed), so that the temperature value of the abnormal region M201 can be changed or normalized.

In other embodiments of the present disclosure not shown in the drawings, the home appliances 300 can further include a refrigerator and at least one electric cable, the temperature detecting apparatus 100 can be configured to detect an abnormal temperature generated from a door of the refrigerator that is not closed, and the temperature detecting apparatus 100 can be configured to detect an abnormal temperature generated from the at least one electric cable that is aged or overloaded.

Figure 6A:
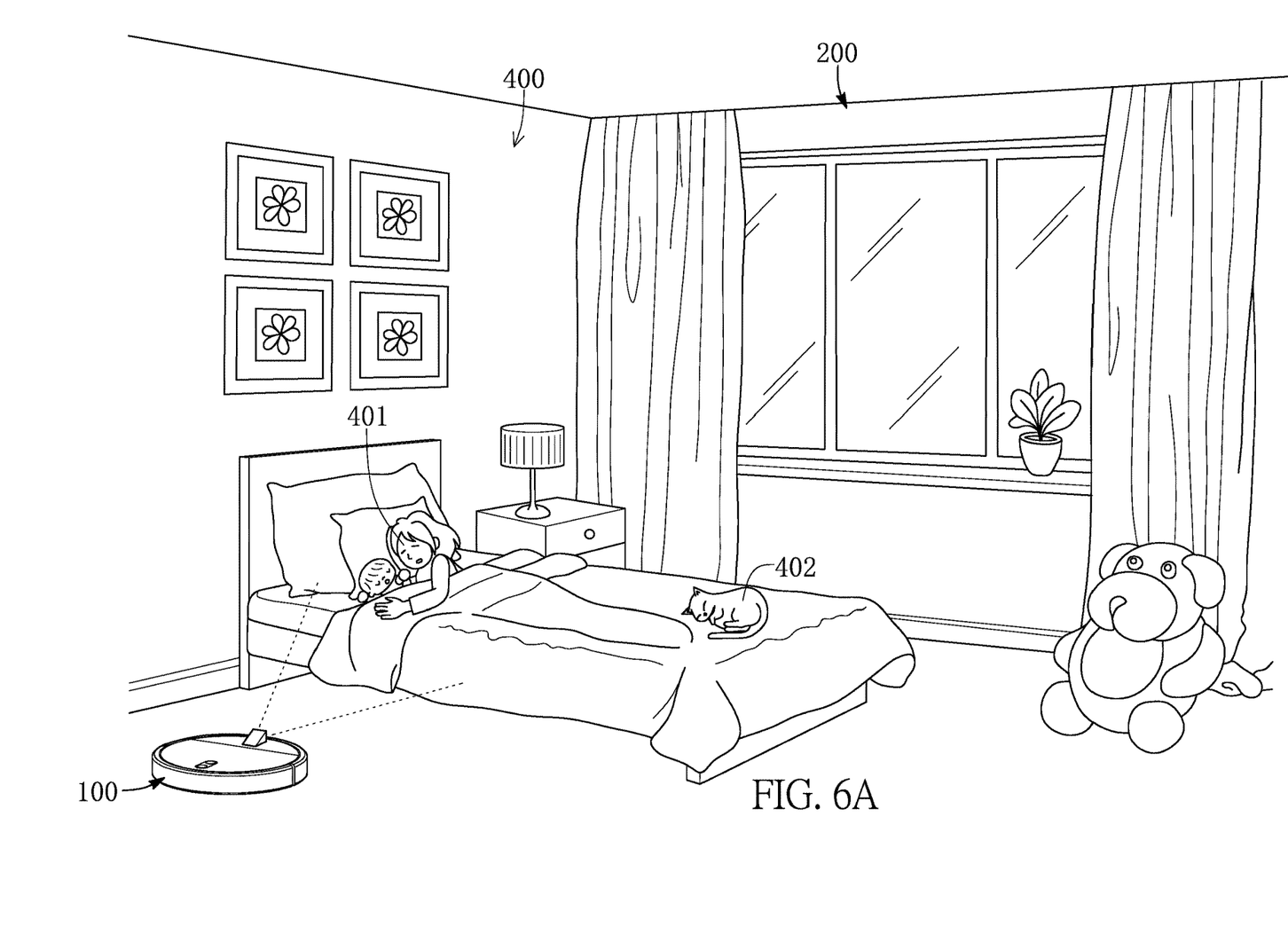
FIG. 6A is a perspective view showing the temperature detecting apparatus of FIG. 1 operated in a room of the working place.
Figure 6B:
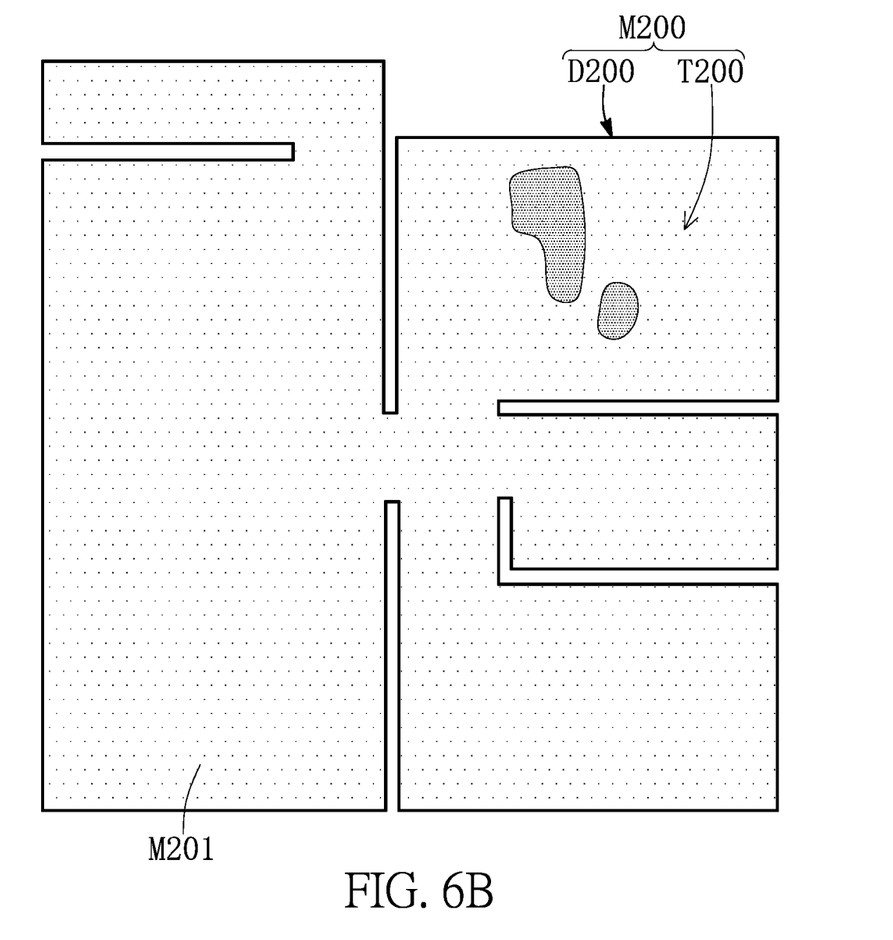
FIG. 6B is a schematic view showing the temperature monitoring map corresponding to FIG. 6A.

As shown in FIG. 2, FIG. 6A, and FIG. 6B, when the movable carrier 1 is the robot vacuum cleaner, the temperature detecting apparatus 100 can be used to perform a home care function. For example, when the working place 200 includes at least one room 400 for a person 401 or a pet 402, the movable carrier 1 is configured to be moved in the at least one room 400 so as to allow the thermal sensor 2 to detect a body temperature of the person 401 or a body temperature of the pet 402.

BENEFICIAL EFFECTS OF THE EMBODIMENT

In conclusion, the temperature detecting apparatus of the present disclosure is provided with the cooperation of the movable carrier and the thermal sensor, so that when the movable carrier is moved in the working place according to the predetermined schedule (or the designated command), the temperature detecting apparatus can implement the dynamical temperature monitor and record of the working place, thereby effectively improving the safety of the working place and expanding a new function other than the existing functions.

Moreover, the temperature detecting apparatus of the present disclosure can be used to monitor the temperature of the working place, and can be used to further implement a deep temperature planning according to the working place. For example, the temperature detecting apparatus can be electrically coupled to at least one home appliance located in the working place through the wireless connection unit, so that the temperature detecting apparatus and the at least one home appliance can share temperature information for implementing an overall temperature planning of the working place.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A temperature detecting apparatus, comprising:
   a robot vacuum cleaner including a control module and a map creating module that is electrically coupled to the control module, wherein the robot vacuum cleaner is movable in a working place according to a predetermined schedule, so that the map creating module is configured to create a digital working map that corresponds to the working place;
   a thermal sensor assembled to the robot vacuum cleaner and electrically coupled to the control module, wherein, when the robot vacuum cleaner is moved according to the predetermined schedule, the thermal sensor is configured to detect the working place so as to generate an immediate temperature distribution of the working place; and
   a wireless connection unit electrically coupled to the control module;
   wherein the control module is configured to map the immediate temperature distribution onto the digital working map so as to create a temperature monitoring map, and the control module is configured to transmit the temperature monitoring map to an external apparatus;
   wherein the temperature detecting apparatus is configured to perform a home care function, and wherein, when the working place includes at least one room for a person or a pet, the robot vacuum cleaner is configured to be moved in the at least one room so as to allow the thermal sensor to detect a body temperature of the person or a body temperature of the pet;
   wherein the temperature detecting apparatus is configured to be electrically coupled to an air conditioner through the wireless connection unit, and wherein, when the immediate temperature distribution generated from the thermal sensor has an abnormal temperature value in a sensing region of the air conditioner, the control module is configured to transmit a driving signal to the air conditioner for blowing toward the sensing region of the air conditioner to change a temperature value of the abnormal region;
   wherein the abnormal temperature value is determined by a plurality of judgement manners that include:
   a) a first judgement manner: before the temperature monitoring map is created, the control module is configured to compare the immediate temperature distribution to a predetermined temperature value, and a first temperature value in the immediate temperature distribution is defined as the abnormal temperature value when the first temperature value is lower than or higher than the predetermined temperature value by a first predetermined difference;
   b) a second judgement manner: before the temperature monitoring map is created, the control module is configured to compare the immediate temperature distribution to an environment temperature value adjacent to the movable carrier, and a second temperature value in the immediate temperature distribution is defined as the abnormal temperature value when the second temperature value is lower than or higher than the environment temperature value by a second predetermined difference; and
   c) a third judgement manner: after the temperature monitoring map is created, the control module is configured to compare the immediate temperature distribution to the temperature monitoring map, and a third temperature value in the immediate temperature distribution is defined as the abnormal temperature value when the third temperature value is lower than or higher than a corresponding temperature value in the temperature monitoring map by a third predetermined difference.

2. The temperature detecting apparatus according to claim 1, wherein, when the robot vacuum cleaner is moved in the working place to implement an environment clean process according to the predetermined schedule, the thermal sensor synchronously generates the immediate temperature distribution.

3. The temperature detecting apparatus according to claim 2, wherein, when the immediate temperature distribution generated from the thermal sensor has an abnormal temperature value, the robot vacuum cleaner is configured to stop implementing the environment clean process, and the robot vacuum cleaner is configured to move toward an abnormal region of the working place having the abnormal temperature value so as to determine a range of the abnormal region.

4. The temperature detecting apparatus according to claim 2, wherein the temperature detecting apparatus is configured to be electrically coupled to at least one home appliance, and wherein, when the immediate temperature distribution generated from the thermal sensor has an abnormal temperature value in an abnormal region, the control module is configured to transmit a driving signal to the at least one home appliance for driving the at least one home appliance to change a temperature value of the abnormal region.

5. The temperature detecting apparatus according to claim 4, wherein the at least one home appliance includes a gas stove, and wherein, when the abnormal region is located at the gas stove, the control module is configured to transmit a driving signal to the gas stove for stopping operation of the gas stove.

6. The temperature detecting apparatus according to claim 1, wherein the thermal sensor is rotatably assembled to the robot vacuum cleaner, so that the immediate temperature distribution generated by the thermal sensor is in a three-dimensional distribution.

7. A temperature detecting apparatus, comprising:
   a robot vacuum cleaner including a control module and a map creating module that is electrically coupled to the control module, wherein the robot vacuum cleaner is movable in a working place according to a designated command, so that the map creating module is configured to create a digital working map that corresponds to the working place;
   a thermal sensor assembled to the robot vacuum cleaner and electrically coupled to the control module, wherein, when the robot vacuum cleaner is moved according to the designated command, the thermal sensor is configured to detect the working place so as to generate an immediate temperature distribution of the working place;
   wherein the control module is configured to map the immediate temperature distribution onto the digital working map so as to create a temperature monitoring map, and the control module is configured to transmit the temperature monitoring map to the external apparatus;

wherein, when the immediate temperature distribution generated from the thermal sensor has an abnormal temperature value, the control module is configured to emit a warning signal to an external apparatus;

wherein the temperature detecting apparatus is configured to perform a home care function, and wherein, when the working place includes at least one room for a person or a pet, the robot vacuum cleaner is configured to be moved in the at least one room so as to allow the thermal sensor to detect a body temperature of the person or a body temperature of the pet;

wherein the abnormal temperature value is determined by a plurality of judgement manners that include:

a) a first judgement manner: before the temperature monitoring map is created, the control module is configured to compare the immediate temperature distribution to a predetermined temperature value, and a first temperature value in the immediate temperature distribution is defined as the abnormal temperature value when the first temperature value is lower than or higher than the predetermined temperature value by a first predetermined difference;

b) a second judgement manner: before the temperature monitoring map is created, the control module is configured to compare the immediate temperature distribution to an environment temperature value adjacent to the movable carrier, and a second temperature value in the immediate temperature distribution is defined as the abnormal temperature value when the second temperature value is lower than or higher than the environment temperature value by a second predetermined difference; and c) a third judgement manner: after the temperature monitoring map is created, the control module is configured to compare the immediate temperature distribution to the temperature monitoring map, and a third temperature value in the immediate temperature distribution is defined as the abnormal temperature value when the third temperature value is lower than or higher than a corresponding temperature value in the temperature monitoring map by a third predetermined difference.

8. The temperature detecting apparatus according to claim 7, wherein the robot vacuum cleaner is periodically movable in the working place according to the designated command.

9. The temperature detecting apparatus according to claim 7, wherein the warning signal emitted from the control module is configured to show an abnormal region of the working place having the abnormal temperature value.

10. The temperature detecting apparatus according to claim 7, wherein, when the abnormal temperature value is detected, the robot vacuum cleaner is configured to move toward an abnormal region of the working place having the abnormal temperature value so as to determine a range of the abnormal region.

11. The temperature detecting apparatus according to claim 7, wherein the thermal sensor is rotatably assembled to the robot vacuum cleaner, so that the immediate temperature distribution generated by the thermal sensor is in a three-dimensional distribution.

* * * * *